Patented June 23, 1931

1,811,531

UNITED STATES PATENT OFFICE

ABRAHAM SIDNEY BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

SILICEOUS MATERIAL AND METHOD OF PRODUCING THE SAME

No Drawing.     Application filed November 4, 1927.  Serial No. 231,164.

This application is a continuation in part of an application Serial No. 708,671 filed upon April 24, 1924.

This invention relates to the synthetic preparation of siliceous materials, such as zeolites or base exchange materials, and particularly to the preparation of such materials by what is known as the "wet method" as distinguished from baking, sintering or fusing the component constituents.

The invention more specifically relates to an improvement in the method of preparing metal containing or base exchange silicates by the interaction of sodium aluminate and silicon oxide or hydroxide or materials containing the same.

It has long been known that substances resembling the zeolites in chemical composition, characteristics, and water softening action, could be formed by the reaction of sodium aluminate on amorphous or precipitated silicic hydrate. In these methods, the sodium aluminate used contained a sufficient excess of sodium hydroxide to dissolve the silicic hydrate to form a solution of sodium silicate, and the resulting base exchange silicate occurred as a result of a reaction between the solution of sodium silicate thus formed and the sodium aluminate.

It has been found that excellent base exchange silicates can be produced by treating an adsorbent active siliceous material such as the gels of silicic acid or silicon dioxide with a solution of sodium aluminate or another alkali metal amphoterate.

Silicic acid gels or silica gels can be treated before, during or after dewatering or drying. These gels may be prepared by causing the gelatinization of selicic acid throughout a solution of the same as by the addition of acidic material to solutions of alkali metal silicates or by the removal of acid from colloidal solutions of silicic acid by dialysis or alkalinization. The latter process may be performed as disclosed in application Serial Number 46,890, filed July 29, 1925, in which a sodium silicate solution is treated with an excess of acid to cause the formation of a colloidal silici acid solution, which latter is then treated with an alkali such as ammonia with the resultant formation of a siliceous gel. It is also possible to produce siliceous gels suitable for treatment in this process by treating a zeolite with an acid to dissolve away part or all of its metallic constituents. A process of this character is disclosed in application Serial Number 46,889, filed July 29, 1925.

The properties of base exchange silicates or metallo-silicates can also be advantageously altered by treatment with sodium aluminate. Such silicates may be produced according to the processes of Patents 1,515,007 and 1,584,716 and applications Serial Number 700,822, filed March 21, 1924; Serial Number 708,671, filed April 24, 1924; Serial Number 708,672, filed April 24, 1924; Serial Number 758,597, filed December 29, 1924; and Serial Number 174,429, filed March 10, 1927, in which alkaline or non-alkaline solutions of amphoteric oxides or hydroxides (e. g. sodium aluminate, aluminum sulphate, etc.) are reacted with solutions of hydrated silica (e. g. sodium silicate, colloidal solutions of silicic acid, etc.) with or without the addition of acids or acidic material (e. g. sulphuric acid, etc.) under such conditions as to form a gel embracing substantially all, or a major portion of the components of the reaction mixture. Such a gel may be treated with sodium aluminate or another alkali metal amphoterate, before, during or after the removal of the water and soluble salts contained therein.

In place of sodium aluminate, alkaline solutions of chromium, lead, zinc and other amphoteric oxides may be used.

In the preferred procedure, a silicic acid gel or a silica gel may be prepared by partially or completely neutralizing a solution of an alkali metal silicate and permitting gelation of the silicic acid throughout the body of the liquid. The gel may be moist or undried when subjected to the reaction with the solution of sodium aluminate, or it may have been partly or completely dried and so treated, either with or without previous washing to remove the soluble compounds. When silica gel or other active siliceous material is used, it is preferred to use particles or granules of about the size desired in the final product.

In the case of dried granules of silica gel, the granules may be boiled for two hours in a solution of sodium aluminate containing about 3 grams of sodium oxide and 2.2 grams of aluminum oxide per liter of solution and thereafter for two hours in a solution of the same character, but twice as strong. The granules or particles, after treatment with the aluminate may be washed to remove the excess solution, and dried, when they are ready for use in the softening of water. These particles are hard, strong and resistant to the powdering action of water. They possess a high base exchange capacity, and are otherwise suitable for technical use.

The final product may be treated with an acid to decrease its metallic oxide content and increase its silica content, or it may be treated with a caustic alkali or an alkali metal carbonate to increase its alkali metal oxide content.

In the preferred procedure, according to this invention, the sodium aluminate will not be present in sufficient quantities to dissolve the siliceous material to form sodium silicate. It is usually desirable to utilize about 13 to 51 grams of aluminum oxide or about 55 to 216 grams of sodium aluminate to every 61 grams of silica. This will be approximately equivalent to $\frac{1}{8}$ to $\frac{1}{2}$ moles of $Al_2O_3$ to every mole of $SiO_2$.

It will be noted that the silica gel or other adsorbent siliceous materials afford porous structures of the desired form and strength. It is not necessary wholly to dissolve the siliceous material and reprecipitate it to obtain a satisfactory base exchange material. It appears that the action of the sodium aluminate is to convert the surface of the siliceous material into a highly active base exchanging substance, while still retaining the strength and durability of the siliceous skeleton.

By the expression "amphoterate" in the accompanying claims, I mean to include the salts of acids in which an amphoteric metal forms part of the acid radicle.

I claim:

1. A process of preparing base exchange silicates, which comprises boiling granules of dried silica gel with a dilute solution of sodium aluminate, then boiling with a strong sodium aluminate solution, washing the particles to remove the excess sodium aluminate and drying.

2. A process of preparing a base exchange silicate, which comprises boiling granules of an adsorbent silica in a solution of an alkali metal aluminate and washing to remove the excess aluminate.

3. A process of preparing a base exchange silicate which comprises treating an adsorbent siliceous gel with an alkali metal amphoterate.

4. A base exchange material comprising the reaction product of sodium aluminate and silica gel.

5. A base exchange material comprising the reaction product of an alkali metal amphoterate and an adsorbent siliceous material.

6. A metallo-silicate comprising the reaction product of an alkali metal aluminate and an active siliceous material only.

7. A process of preparing siliceous materials which comprises reacting together an alkali metal amphoterate, and a metallo siliceous gel.

8. A process of preparing siliceous materials, which comprises treating with a solution of an alkali metal amphoterate, a siliceous gel formed by the reaction of a solution of sodium silicate and a solution of aluminum sulphate.

9. A process of preparing siliceous material, which comprises boiling an adsorbent siliceous gel in an alkali metal aluminate solution for at least about an hour.

10. A process of improving siliceous materials, which comprises treating adsorbent siliceous gels with an alkali metal aluminate containing insufficient alkali to cause any substantial solution of the siliceous materials.

11. A process of improving siliceous materials, which comprises treating adsorbent siliceous gels with an alkali metal aluminate containing about 13 to 51 grams of $Al_2O_3$ to every 61 grams of silica.

12. A process of preparing base exchange silicates, which comprises subjecting granules of dried silica gel to two successive boiling treatments with sodium aluminate solutions.

In testimony whereof I have hereunto subscribed my name.

ABRAHAM SIDNEY BEHRMAN.